United States Patent
Hrabal

(10) Patent No.: US 10,226,974 B2
(45) Date of Patent: Mar. 12, 2019

(54) SELF-REINFLATING TIRE

(75) Inventor: František Hrabal, Prague (CZ)

(73) Assignee: CODA Innovations sro, Prague (CZ)

( * ) Notice: Subject to any disclaimer, the term of this patent is extended or adjusted under 35 U.S.C. 154(b) by 438 days.

(21) Appl. No.: 13/509,289

(22) PCT Filed: Nov. 11, 2010

(86) PCT No.: PCT/CZ2010/000114
§ 371 (c)(1),
(2), (4) Date: Jun. 2, 2012

(87) PCT Pub. No.: WO2011/057591
PCT Pub. Date: May 19, 2011

(65) Prior Publication Data
US 2012/0285596 A1 Nov. 15, 2012

(30) Foreign Application Priority Data
Nov. 11, 2009 (CZ) .................... 2009-748

(51) Int. Cl.
*B60C 23/12* (2006.01)
*B60C 23/00* (2006.01)
*B60C 23/04* (2006.01)

(52) U.S. Cl.
CPC ............ *B60C 23/12* (2013.01); *B60C 23/007* (2013.01); *B60C 23/041* (2013.01); *B60C 2200/06* (2013.01); *B60C 2200/10* (2013.01); *B60C 2200/12* (2013.01); *Y10T 152/10495* (2015.01)

(58) Field of Classification Search
CPC ..... B60C 23/001; B60C 23/004; B60C 23/10; B60C 23/12

USPC ................ 152/415, 418, 419, 423, 424, 425
See application file for complete search history.

(56) References Cited

U.S. PATENT DOCUMENTS

| 615,187 | A | * | 11/1898 | Kersting | ................. | B60C 23/12 |
| | | | | | | 152/426 |
| 1,050,886 | A | * | 1/1913 | Wetherell | ...................... | 152/426 |
| 3,304,981 | A | * | 2/1967 | Sheppard | ...................... | 152/426 |
| 4,651,792 | A | | 3/1987 | Taylor | | |
| 4,922,984 | A | * | 5/1990 | Dosjoub et al. | ............... | 152/415 |
| 8,113,254 | B2 | * | 2/2012 | Benedict | ...................... | 152/426 |
| 8,381,784 | B2 | * | 2/2013 | Delgado | ...................... | 152/415 |

(Continued)

FOREIGN PATENT DOCUMENTS

| DE | 3433318 A1 | * | 3/1986 | ............ | B60C 23/12 |
| DE | 4323835 A1 | | 1/1995 | | |

(Continued)

OTHER PUBLICATIONS

International Search Report for correponding International application No. PCT/CZ2010/000114.

(Continued)

*Primary Examiner* — Kip T Kotter
(74) *Attorney, Agent, or Firm* — WRB-IP LLP

(57) ABSTRACT

A device for transport of air in the tire P or close to it consisting of a chamber K in the shape of a hollow compressible channel, placed along at least a part of the tire perimeter, characterized by the fact that a ring OK is placed at the inner side of the chamber K with the distance of its outer side from the tire axis of rotation equal to 1 to 1.1 multiple of the distance of the bottom side of the chamber K from the axis of rotation of the tire P.

11 Claims, 8 Drawing Sheets

(56) References Cited

U.S. PATENT DOCUMENTS

| | | | |
|---|---|---|---|
| 8,381,785 B2* | 2/2013 | Losey | 152/450 |
| 8,534,335 B2* | 9/2013 | Benedict | 152/426 |
| 2005/0126273 A1* | 6/2005 | Hrabal | 73/146 |
| 2006/0118224 A1* | 6/2006 | Ellmann | 152/415 |
| 2006/0220814 A1 | 10/2006 | Kawashima | |
| 2009/0044891 A1* | 2/2009 | Lee | 152/416 |
| 2009/0294006 A1* | 12/2009 | Hrabal | 152/426 |
| 2010/0243121 A1* | 9/2010 | Eigenbrode | B60C 23/12 |
| | | | 152/419 |

FOREIGN PATENT DOCUMENTS

| | | |
|---|---|---|
| EP | 0125047 A1 | 11/1984 |
| EP | 2065228 A1 | 6/2009 |
| GB | 1510738 A | 5/1978 |
| GB | 2329160 A | 3/1999 |
| RU | 2106978 C1 * | 3/1998 |
| WO | 03049958 A1 | 6/2003 |
| WO | 2007134556 A1 | 11/2007 |
| WO | 2009103252 A2 | 8/2009 |

OTHER PUBLICATIONS

European Official Action (dated Dec. 4, 2017) for corresponding European App. EP10816301.5.

* cited by examiner

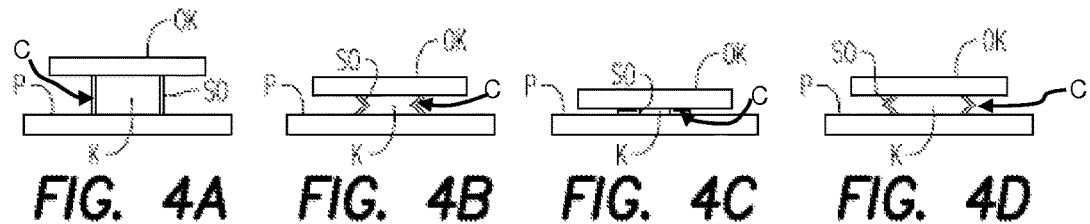
FIG. 4A    FIG. 4B    FIG. 4C    FIG. 4D
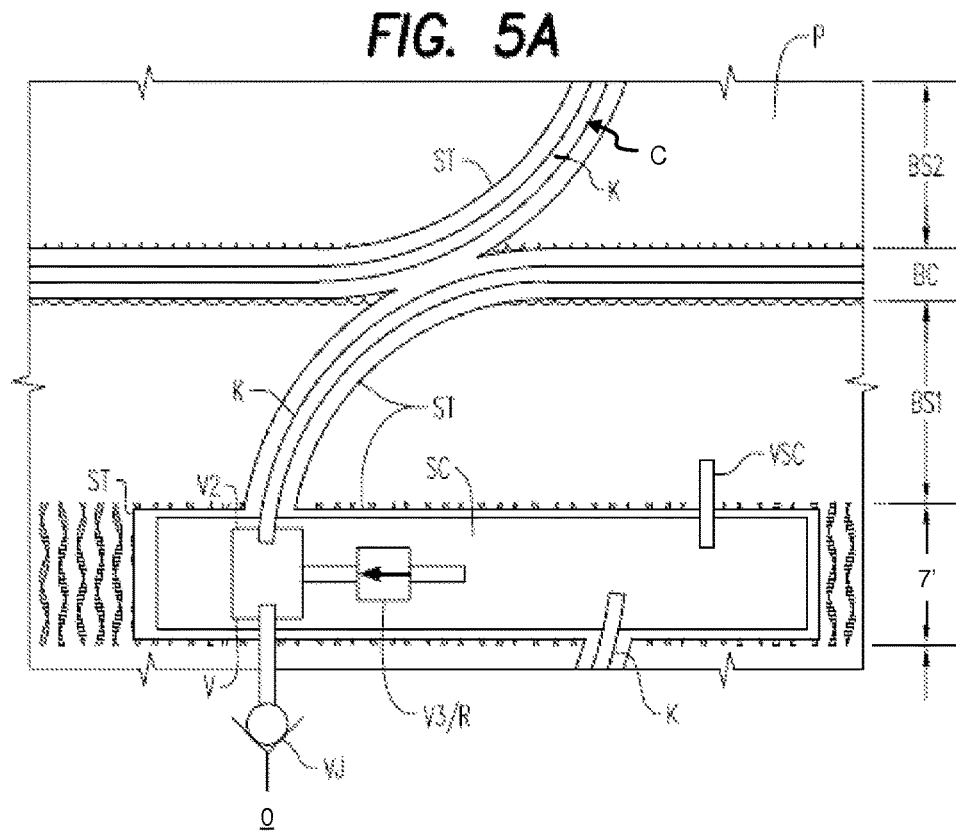

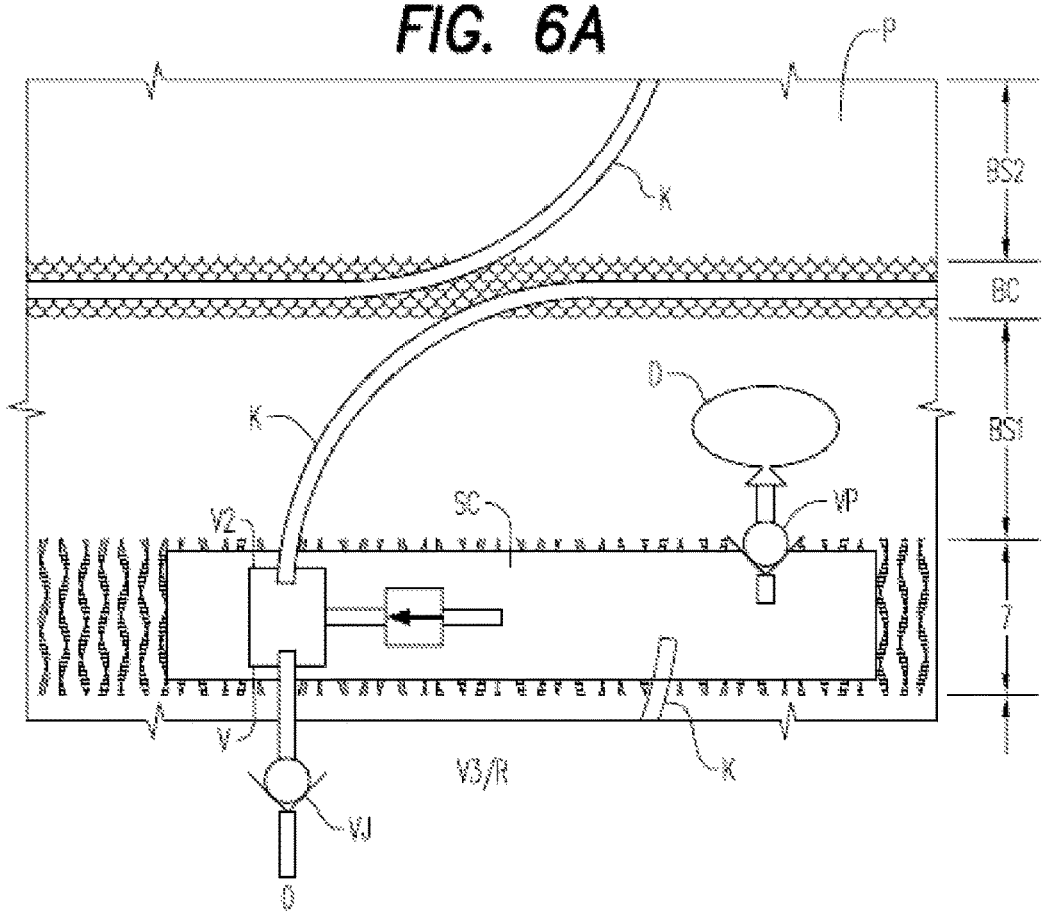
FIG. 6A
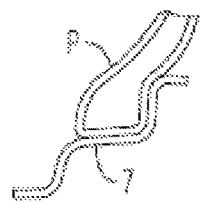
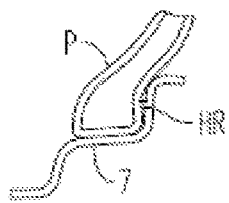
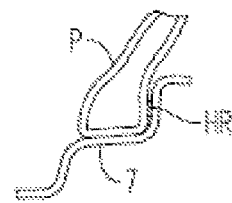
FIG. 7A  FIG. 7B  FIG. 7C

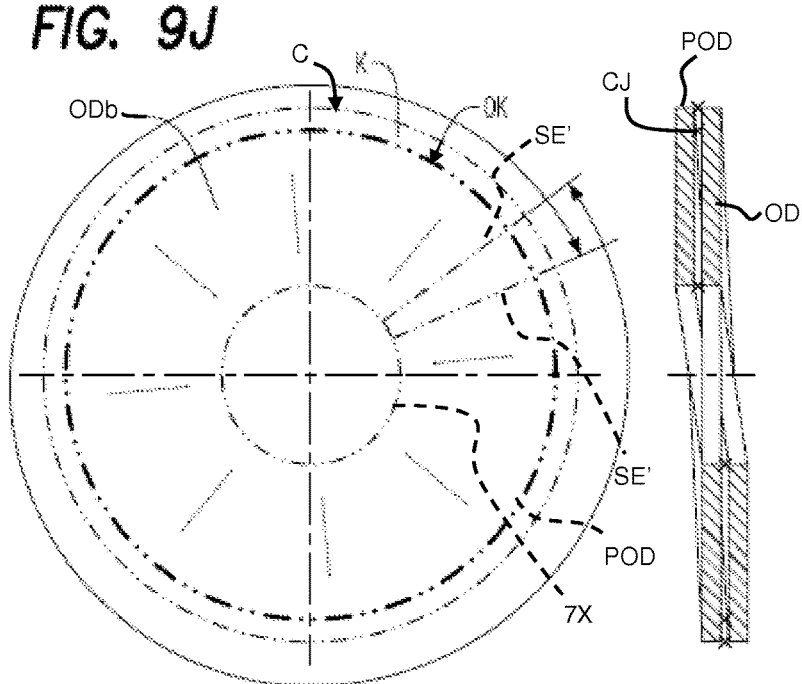
FIG. 9J
FIG. 9K
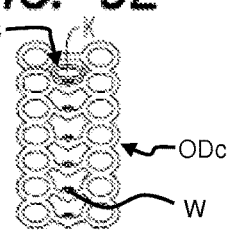
FIG. 9L
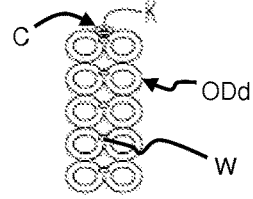
FIG. 9M
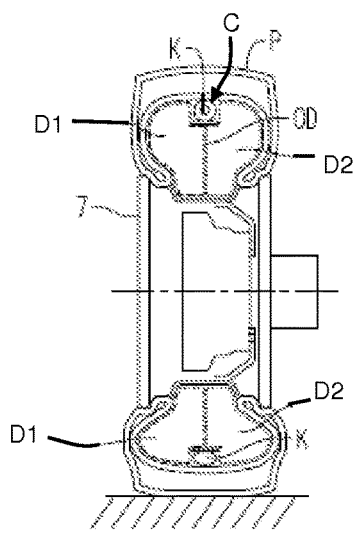
FIG. 10A
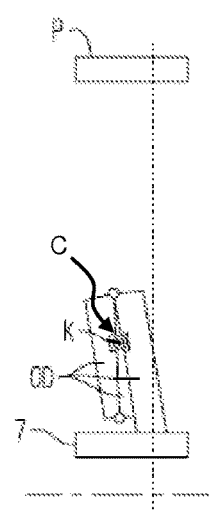
FIG. 10B
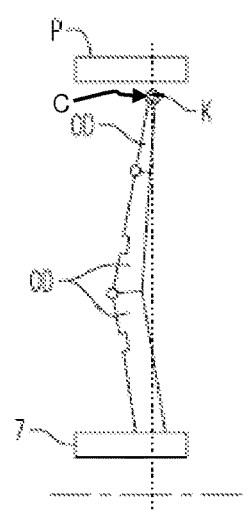
FIG. 10C

SELF-REINFLATING TIRE

BACKGROUND AND SUMMARY

The invention concerns a device for transport of air in a tire, consisting of or comprising a hollow compressible channel located along at least a part of the tire perimeter and fitted with at least one end opening into the tire and at least one end opening into the external environment.

Different solutions for maintenance of pressure in the tire under operation are used in technical practice. For example, a tire can be provided with air feed by being connected to an external pressure source. Drawbacks of these solutions are extensive purchase costs and complexity of the device itself.

Self-reinflating tires are in use too. For instance, an exemplary self-reinflating tire is described in patent applications CZ PV 2002-1364 and CZ PV 2001-4451. An air feed chamber is located in a tire wall or next to it. With tire deformation advancing by rolling, the chamber is periodically completely pressed down or broken crosswise; advancing chamber compression down to zero cross-section pushes the medium contained within the chamber ahead, leaving a vacuum behind. A hose-shaped chamber placed in the tire wall or next to it, along the tire perimeter, works as a peristaltic pump.

In a device for transport of air in a tire or close to it, consisting of or comprising a chamber in form of a hollow compressible channel, placed along at least a part of the tire perimeter, according to this invention the above-mentioned drawbacks have been eliminated to high extent. In essence, a ring is attached to the inner side of the chamber and a distance of the ring's outer side from a tire rotation axis equals 1 to 1.1 multiple of a distance of a chamber bottom side from the tire rotation axis.

Another type of device for transport of air is a device for transport of air in the tire or close to it with a channel fitted with a valve on at least one input of the valve.

The channel can be interconnected with the tire tube and/or backup air tire tube and/or case and/or base by at least one end of the channel.

Another type of device for transport of air is a device for transport of air in the tire or close to it fitted with a control element interconnected with a sensor located in a completely separated space formed by a sealed bag, which is, from an outside, at least partly under pressure of air in the tire and/or case and/or base.

The space for the chamber can be made by inserting a cradle between the tire and rim.

Yet another type of device for transport of air is a device for compression of the air in the tire or close to it with the chamber and/or any pump inserted between two coupled wheels.

The chamber and/or any pump in the tire can be placed on a base. Effectively, the base or comprises a hollow disc. Effectively, the base has its opposing walls joined which defines its cross-section. The base can be a rigid and/or collapsible system and/or spring and/or spring material. The base completely or almost completely prevents air exchange between two parts of the tire pressure space separated by it. Effectively, the base is fitted with at least one valve and/or vent interconnecting the base of the separated part of the tire pressure space.

Another subject of the invention is a device for transport of air in the tire or close to it with a chamber with shape memory placed in the tire wall or close to it and a power generator placed at the end of the chamber.

Effectively, the ring is placed on an air tube and/or bag placed inside a tire and filled by air. Effectively, a chamber end is interconnected with the air tube and/or bag and/or base and/or case. The chamber end can be fitted with a control element which may be a closure element.

Effectively, a valve is a three-way valve with its ends interconnected with the external environment and the internal space of the tire, where one end is provided with a valve, the next end is connected to the chamber with shape memory, and the last end is interconnected with the control element (which may be a closure element). Effectively, a channel is, at least in its part, formed by a lengthwise segmented chamber provided with 4 openings, where a longitudinal divisional plane is movable in a direction of deformation of at least one of the segmented parts of the chamber and at least one opening is provided with a valve and/or at least one segmented part of the chamber is permanently blocked by the deformation. The lengthwise segmented chamber can be placed in the wall and/or close to the wall of the tire and/or air tube and is provided with 3 openings into the tire and one opening into the external environment or with 3 openings into the external environment and one opening into the tire and/or the end of one longitudinal part of the chamber is interconnected with the end of the second longitudinal part of the chamber. The channel and/or chamber can be made by at least one of two flexible tubes placed next to each other, where one has the outer diameter equal to the inner diameter of the other tube and/or one is, at least partly, inserted inside the other.

Effectively, the chamber is in form of a curved hollow channel with at least one its outer wall at least partly formed by at least a part of two areas lying in the longitudinal direction of the chamber, containing the angle a=0 to 120, while it is true that if a>0 it is located on the contact edge of these areas situated on the further side from the center of the area of the chamber cross-section.

The ring can be of a variable length. Effectively, the ring has a T-, I-, or O-shaped section or alike.

A ring or pressure transmitter acts on the chamber wall with less area than the area from which the tire pressure acts on it from the opposite side.

Another subject of the invention is a tire and/or rim and/or air tube and/or base and/or chamber containing adhesive and/or sectional lock to interconnect with any element from the group of tire and/or rim and/or air tube and/or base and/or chamber.

Yet another subject of the invention is a tire and/or rim adapted for placing of any device.

Another subject of the invention is a tire interconnected with a coil and/or magnet.

BRIEF DESCRIPTION OF THE DRAWINGS

The invention will be described in more details on particular examples of different design types using the drawings attached.

FIG. 4A is a schematic, partially cross-sectional view of a portion of an uncompressed chamber for a tire according to an aspect of the present invention.

FIG. 4B is a schematic, partially cross-sectional view of a portion of a partially compressed chamber for a tire according to another aspect of the present invention.

FIG. 4C is a schematic, partially cross-sectional view of a portion of fully compressed chamber for a tire according to an aspect of the present invention.

FIG. 4D is a schematic, partially cross-sectional view of a portion of an overpressured chamber for a tire according to an aspect of the present invention.

FIG. 5A is a schematic view of a section of a tire according another aspect of the present invention with the tire unrolled.

FIG. 6A is a schematic view of a section of a tire according yet another aspect of the present invention with the tire unrolled.

FIG. 7A is a schematic, cross-sectional view of a portion of an unloaded tire mounted on a rim.

FIG. 7B is a schematic, cross-sectional view of a portion of a loaded tire with a cradle according to an aspect of the present invention mounted on a rim.

FIG. 7C is a schematic, cross-sectional view of a portion of an unloaded tire with a cradle mounted on a rim.

FIG. 9J is a schematic, cross-sectional view of a base for a chamber according to another aspect of the present invention.

FIG. 9K is a schematic, cross-sectional view of the base of FIG. 9J taken perpendicular to FIG. 9J.

FIG. 9L is a schematic, cross-sectional view of a base for a chamber according to yet another aspect of the present invention.

FIG. 9M is a schematic, cross-sectional view of a base for a chamber according to still another aspect of the present invention.

FIG. 10A is a schematic, cross-sectional view of a base for a chamber according to still another aspect of the present invention.

FIG. 10B is a schematic, cross-sectional view of a base for a chamber prior to being unrolled by centrifugal force according to still another aspect of the present invention.

FIG. 10C is a schematic, cross-sectional view of the base for a chamber of FIG. 10B after being unrolled by centrifugal force.

DETAILED DESCRIPTION

For illustration, the invention is described below on individual examples of its arrangement.

Example 1

Figure 1A:
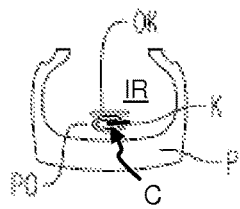
FIG. 1A is a schematic, partially cross-sectional view of a portion of a tire according to an aspect of the present invention.
Figure 1C:
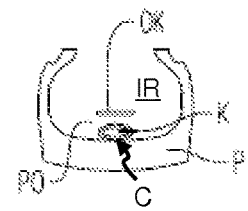
FIG. 1C is a schematic, partially cross-sectional view of a portion of a tire according to another aspect of the present invention.

According to the present invention, a component C defines a chamber K for adjustment of pressure in a tire P. The component C may be separate from the tire P, such as in the form of a tube as seen, for example, in FIGS. 1A-2C, or may be an integral part of the tire as seen, for example, in FIG. 3A. For purposes of discussion, the invention will be described in terms of the chamber K for adjustment of pressure, it being understood that the chamber is defined by the component C. The chamber K for adjustment of pressure in the tire P is created inside the tire P alongside its tread part in a space defined by a wall of the tire P from the top (i.e., radially outer side) and by at least a part of the ring OK from the bottom (i.e., radially inner side) with its length defined in such a way that an unloaded part of the ring OK is away from the wall of the tire P. It means if the wall of the tire P lies, for example, on the radius of 50 cm and the ring OK on the radius of 49 cm there will be a 1 cm high space between them. Such a space between the ring OK and the wall of the tire P will be thereinafter called PO. The chamber K can be placed within this space PO. A loaded tire P bears against the chamber K at a point of load deformation and closes the chamber crosswise when the deformation of the tire P overcomes the whole cross-section of the chamber K. This structure facilitates functioning of the chamber K for the inflation of the tire P; the location of the point or region of closure of the chamber K moves along the chamber K and pumps air towards an inner reservoir IR such as the inside of the tire P or an air tube D (FIG. 2C) inside the tire thus reinflating it. The chamber K can fill up the entire aforementioned 1 cm space, or it can be smaller and adjoin the ring OK as seen in FIG. 1A, wall of the tire P as seen in FIG. 1C, or lie in between them, alternatively it can be an integral part of the tire P, ring OK, or both. If the chamber K does not fill up the entire cross-section of the aforesaid space PO the remaining volume of this space PO may be effectively separated from the tire pressure space. Alternatively, this space is vented outside the tire P or it can be interconnected with the inlet of the chamber K and the air is exhausted from it at the beginning and pumped into the tire P. If the deformation in this example becomes bigger than 1 cm the ring OK and the air tube D (FIG. 2C) of the tire P can deform towards the inside of the tire P.

Example 2

Figure 2A:
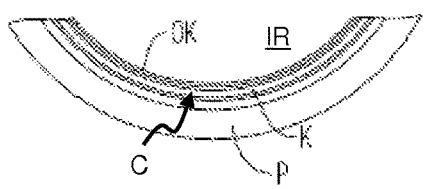
FIG. 2A is a schematic, partially cross-sectional view of a portion of the tire according to FIG. 1A perpendicular to the view in FIG. 1A.
Figure 1B:
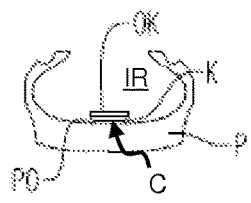
FIG. 1B is a schematic, partially cross-sectional view of a portion of a deformed tire according to an aspect of the present invention.
Figure 2B:
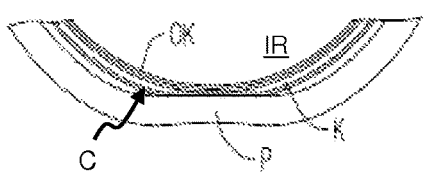
FIG. 2B is a schematic, partially cross-sectional view of a portion of the tire according to FIG. 1B perpendicular to the view in FIG. 1B.
Figure 2C:
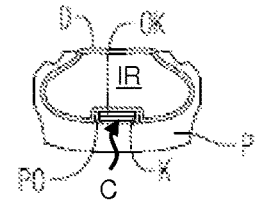
FIG. 2C is a schematic, partially cross-sectional view of a portion of a tire with an air tube according to another aspect of the present invention.

FIGS. 1*a* and 1*b* show a section through an non-deformed tire P, ring OK placed near the inner tread part of the tire P and chamber K placed between the ring OK and the wall of the tire P. FIG. 1*b* shows the tire P deformed and chamber K closed crosswise. While the chamber K on FIG. 1*a* is placed within the space PO and at its side at the ring OK, the chamber K on FIG. 1*c* is placed within the space PO on the opposite side, at the tire wall. The FIG. 2C shows a similar situation as FIG. 1*b* but with the air tube D added. As seen in FIG. 2C, the ring OK is disposed radially inwardly of a radially inner side of the chamber K and, preferably, a radial distance between the radially inner side of the chamber K and an axis of rotation of the tire is equal to 1 to 1.1 times a radial distance between a radially outer side of the ring OK at lateral edges of the ring at radially outermost parts of the ring and the axis of rotation of the tire. A structure distinct from the tire, such as the air tube D, defines an inner reservoir at least partially disposed between the ring and the tire, wherein the component is disposed outside of the inner reservoir, and wherein an exterior surface of the structure is in contact with an inner surface of the ring.

Example 3

Because the ring OK could move freely inside the tire P, thus disabling proper functioning, it needs to be fixed in an appropriate location. One option is to place the ring OK onto the air tube D of the tire P as seen in FIG. 2C. The inflated air tube D adjoins the walls of the tire P; only in point of mounting of the ring OK the air tube D does not adjoin the wall of the tire P but the wall of the ring OK thus holding it in place. The air tube D is a structure disposed at least partially between lateral edges of the ring OK and the interior wall of the tire P. Because the main task of the ring OK in this case is to define the maximum diameter of the air tube D where it contacts the ring OK and set the space PO for the chamber K or the space of the chamber K itself, the ring OK can be made of e.g. textile, however the ring must have a clearly defined maximum circumference to ensure that it is a sufficient distance from the wall of the tire P, at least in a part of its perimeter. This has already been shown and described in FIG. 1A depicting a section through a loaded tire P, ring OK, and chamber K in point of placement of the ring OK and in FIG. 2A depicting the same situation only in side cross-section. Likewise, the FIG. 2B shows a side cross-section of FIG. 1B at a point of the load where the chamber K is closed crosswise by the load deformation section of which can be seen in FIG. 1B.

To enable reinflation of the tire P, at least a same or a slightly higher pressure than the pressure in the tire P must be reached inside the chamber K between the place of its deformation and the output from the chamber K into the tire P, and an under-pressure must be reached on the opposite side of the deformation in the chamber K, which will allow additional intake of air from the outside of the tire P. This must be ensured by forces acting on the walls of the chamber K causing its closure. So there must be a sufficient pressure of the ring towards the chamber K. Whereas the pressure of the air tube D and thus also the pressure of the tire P act on the ring OK from one side and a same or just slightly higher pressure of the air in the chamber K from the other side this can be ensured e.g. by the mere pressure of the air tube D on the ring OK, alternatively enhanced by the centrifugal force acting on the ring OK in the direction of closure of the chamber K. If this is not sufficient the ring OK can be made of more rigid material where its pretension will further act in the direction of closure of the chamber K. Likewise, the area which the pressure of the tire P acts on can be enlarged for this purpose compared to the area by which the pressure of air compressed in the chamber K will act against it so that the total force in the direction of closure of the chamber K is greater than the force pointing against the closure of the chamber K.

The chamber K must be connected to its input and output, or to the control element ideally placed at the rim. So interconnecting interfaces need to be created. These must be through-going, for the output from the chamber K they can keep their throughput because there is the same pressure or overpressure against the pressure of the tire P inside them, however, on the inputs an under-pressure will occur inside the interfaces which could collapse their walls together and disable the air flow by means of it or make it more difficult. Therefore it is advisable to use interfaces with a defined cross-section ensured by the shape stability of their walls so that they can withstand the ambient pressure, that is the pressure of the tire P. The air flowing upon partial collapse of the interfaces could also build up excessive heat which is undesirable. The interfaces can be placed in a recess in the wall of the tire P or the air tube D.

The chamber K with the ring OK can be integrated into the air tube D, which would make both its manufacture and assembly easier.

The ring OK can have an adjustable length; thus it will stretch or shrink depending on the diameter of the tire P into which the ring OK with the chamber K is being placed. One ring OK with the chamber K or, alternatively, the air tube D with ring OK and chamber K can then be used for different diameters of tires P, with only the length of the ring OK adjusted each time. The ring need not necessarily be an independent part, and the chamber K itself, with a defined length in point of contact with the air tube of the tire P, can take over its task.

Figure 3A:
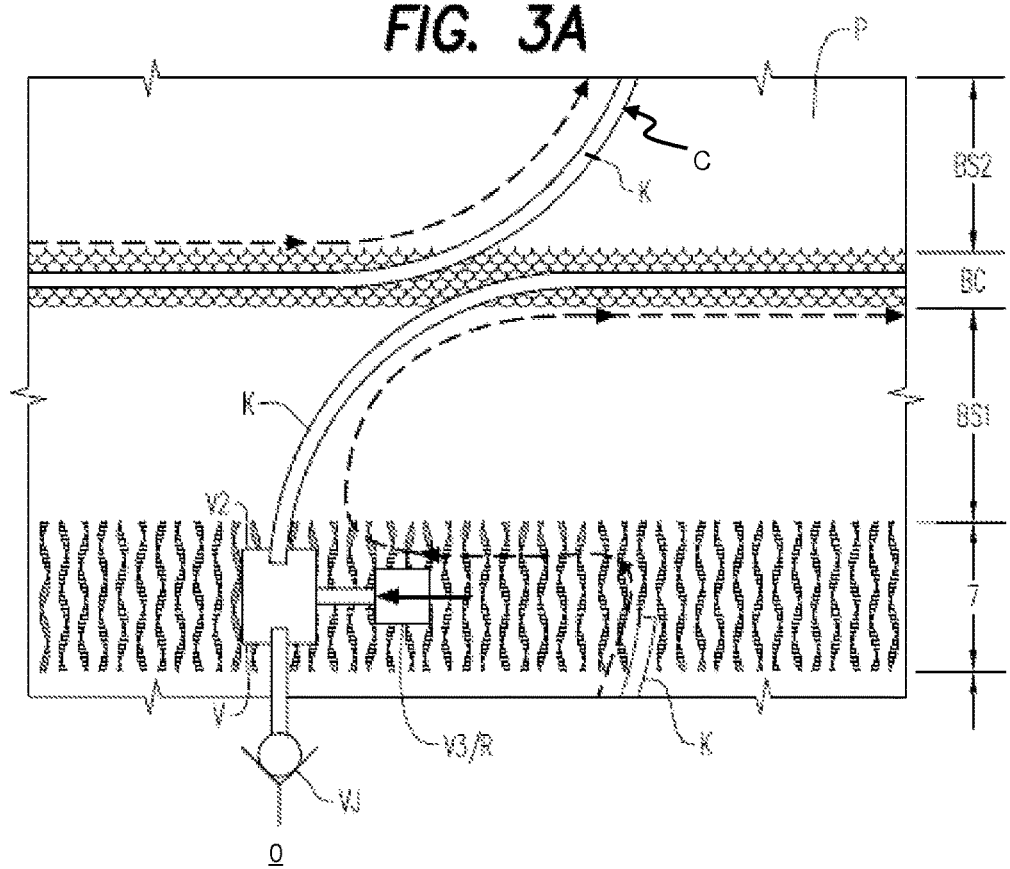
FIG. 3A is a schematic view of a section of a tire according an aspect of the present invention with the tire unrolled.

FIG. 3A shows the whole system in one of its simplest design types, intended for a bicycle in this example. FIG. 3A shows a unrolled bicycle tire in the complete cross-section and in the part of the length of tire P and rim 7, where the chamber K at least partially defined by a component C is integrated in the bicycle tire. The chamber K begins inside the 3-way valve V which is located on the rim 7, then it continues with the side wall BS1 of tire P into the tread part BC of tire P, which copies the whole perimeter of the tire P and returns to the rim 7 along the side wall BS2 of tire P where it opens into the internal space such as an inner reservoir IR (FIGS. 1A-2C) of tire P (the inner reservoir IR may be formed by the air tube D shown in FIG. 2C, if provided). The chamber K in this case needs not continue as far as back to the rim 7 as is shown in FIG. 3A but can open into the internal space of tire P already by the tread BC. The broken arrow shows internal air circulation from within the tire P through the control element R and input V3 of the 3-way valve V into the chamber K, by which it is moved mainly along the tread back into the tire P. Only in an underinflated tire is the input V3 closed by the control element R; however, the air continues to be drawn out of the space of the 3-way valve V, in which vacuum generates and which draws in the air from the external environment O through the non-return valve VJ until the input V3 is unblocked by the control element R. This element can be controlled automatically or manually. The whole assembly in FIG. 3A simply consists only of or comprises the chamber K interconnected with the control element R and the non-return valve VJ.

Example 4

Another way to fix the ring OK is to set it from the walls of tire P using the walls SO of chamber K at least partially defined by a component C as shown in FIGS. 4A-4D. The chamber K thus fills up the space between the ring OK and wall of tire P while the ring OK in point of deformation of the tire P pushes against the chamber K because of its pretension, which can be set by the rigidity of the ring OK or by the increased rigidity of the walls SO of chamber K aside from the point of deformation of the chamber K. The tire P deforms the chamber K in a relatively short section of its length and thus, even though the wall SO of chamber K collapses in point of deformation and closes down, the rest of the chamber K will hold the ring OK in the right distance thus helping to increase the rigidity of the ring OK in point of deformation. This can be further assisted so that the chamber K has a sufficient lengthwise rigidity which will prevent the connected ring OK from being offset. The rigidity of the ring OK preventing its deflection can be increased by making it T-shaped or of similar shape.

Because in this example the pressure within the tire P acts on the external walls SO of chamber K, the chamber could collapse towards the ring OK along the whole length of the chamber K so that the chamber would not function. This can be prevented if the chamber K is made with sufficiently rigid walls SO or with pretension of its walls or if it is connected with the tire P, where the chamber K wall SO touching the tire P wall is glued to this wall or is integrated in it or made as a part of the tire P during manufacture of the tire.

The FIG. 4A shows an exemplary design of the chamber K with pre-tensioned walls SO stretched between the wall of the tire P and the ring OK in a condition where the chamber K is not loaded by the deformation of the tire P. On the contrary, the FIG. 4B shows the beginning deformation of the tire P where the walls SO of the chamber K start to collapse due to the pressure between the tire P and the ring OK and also due to the pressure of air in the tire P, which is ambient to the chamber K in this case. FIG. 4C shows a fully closed chamber K where the side walls SO are collapsed towards the chamber K center. Though FIG. 4C shows a residual unclosed space between the walls SO of the chamber K, this is only illustrated so as to show the side walls of the chamber K folded down between the ring OK and the tire P wall. In practice, the side walls SO can be negligibly thin, or a recess in the ring OK or in the tire P wall can be made for them, or the folded walls themselves can fill the empty space between them if their common "folded" length is equal to their original distance. All the walls SO of the chamber K will thus bear on themselves and seal the chamber K hermetically. If the chamber K is made independent on the tire P it can be attached to the tire P, apart from the aforementioned gluing, also using e.g. a sectional lock created on the tire P wall. Effectively, the upper wall of chamber K can be created on a different pre-tensioned ring copying the tire P wall, fixed to the tire P or not. In practice, the height of the chamber K can be in the range of millimeters or even tenths of millimeters, which will make the pretension of chamber K side walls SO even easier. These walls SO can be tensioned up even by a mere pressure difference between the pressure inside and outside the chamber K.

FIGS. 4A-4D show the width of the ring OK, which is affected by the tire P internal pressure from one side, apparently bigger than the width of the chamber K acting on the ring OK from the opposite side. This difference can ensure that the force pointing towards the closure of the chamber K is always higher than the push-away of the ring OK from the chamber K and its non-closure.

In spite of the fact that the chamber K opens into the tire P through its output a light overpressure against the tire P can be generated within the chamber K. In fact, this will occur there in raised speeds. An overpressure can also happen if the output into the tire P is fitted with a non-return valve because of the resistance of this valve. If this overpressure is desirable but not sufficient it can be increased by throttling the output of the chamber K. The overpressure allows the walls SO of the chamber K to expand evenly outwards to form the chamber K as shown in FIG. 4D.

The chamber K can be made in such a way that it gets closed by deformation in two points at once near both its input and output. This will ensure the enhanced performance of the chamber K because otherwise the chamber K would be filled by the air from the tire P at least once per turn, which would have to be first evacuated from it in every turn and only then a sufficient underpressure would occur so as to draw in the air from the source. However, if the ends of the chamber K are close enough to each other so that they both get closed by the deformation at once or if the ends of the chamber overlap, a constant underpressure will be generated in the input of the chamber K. Several examples herein involve a chamber provided with a valve in the input from the external environment, with internal air circulation, however, a chamber K with a valve in the output into the tire P would behave in a similar way. For the sake of simplicity, the examples do not describe all versions of air circulation.

Example 5

The chamber K can be made independent and it can be placed between the tire and air tube. FIG. 5A shows a chamber K at least partially defined by a component C located on an unrolled outer area of the tire P with its components fixed on a strip of material ST where this strip ST is continuous along the whole wheel perimeter in the tread part BC, functioning as the ring OK. The strip ST can be placed between an air tube D (see FIG. 2C) and the tire P and it is fixed when the tube D is inflated. The input and output from the chamber K into the tube D can be solved like in FIG. 3A, i.e. leading directly into the air tube D, nevertheless a case SC is added in FIG. 5A which can have two functions. The first function is shown in FIG. 5A: The case SC protects the components and their placement, by the rim 7' in this instance, and interconnects the output from the chamber K and the input V3 with the interior of the air tube D (see FIG. 2C) through a single output VSC. The other important function, which is not shown in FIG. 5A but in FIG. 6A can be separation of air circulation from the internal space (such as the inner reservoir IR (FIGS. 1A-2C)) itself of the tire P or air tube D. In such a case the output VSC would be provided with a valve that would carry air from the case SC only if the tire P is underinflated.

The case SC would then be a separate pressure space with a maintained preset pressure and the case SC would then function as a compressed air reservoir. It has the advantage that if the chamber or its components are damaged it will not let the air of the tire P out. Also if the chamber made in this way leaks the air into the external environment for some reason it does not need to be of a too tight design. The case will pressurize back to its preset value when the wheel starts moving. This can be beneficial especially in case of the external circulation when the input and output of the chamber open into the case SC and the case SC is also interconnected with the external environment O and the output of the chamber K is rerouted directly into the tire P only when it is underinflated. The case has inside itself the pressure equal to the ambient pressure i.e. 1 Atmosphere, the air circulates only between the chamber K and case SC, and the case SC sucks in the air from the environment O only when the tire P is being inflated. A valve can be placed between the case SC and the environment O but is not necessarily provided; there is not a major suction from the external environment O into the case SC until the inflation starts. Such a design will prevent constant pumping the ambient air through the chamber K along with its contaminants. The width of the chamber K and ring OK is relatively negligible and the air tube walls will set themselves against the tire inner wall. If the chamber K or ring OK were wider the air tube would expand towards the sides rather than upwards thus decreasing the diameter of the tire P which would then leave no space for the chamber K. This can be prevented by the above-mentioned narrow chamber, profiled wall of the tire P or ring OK in point of contact with the tube and tire, or by placing the tube into the casing which would define its inflated section and leave space for the chamber K between the tube and tire.

The chamber K can be made quite simply between the tube and the wall of the tire P so that the chamber K will be defined by the wall of the tire P from the top, by the ring OK from the bottom and sealed by the side rings or walls SO from the sides as seen in FIGS. 4A-4D. The air tube D will bear on both the ring OK and walls SO which will set them and at the same time it will push the walls SO to the wall of the tire P. Pressing the walls SO on the tire P wall will seal these components and disable air leak from the chamber behind the walls. The condition for sealing is only a higher pressure between them than the pressure of air compressed in the chamber K. Again, this pressure can be reached by pre-tensioning the walls SO against the tire P wall and/or enlarging the area of the walls on which the air tube D pushes in the direction of pressing against the tire wall. FIG. 4A shows the chamber K made in this way where the contact area of the walls SO with the tube is larger than the contact area of the walls SO with the tire P wall.

Example 6

The interfaces can be integrated in the wall of the tire P if they are manufactured together with the tire P; they can also be glued to the tire P wall, run in mounts designed for this purpose or they can be fixed by the pressure between the air tube and tire casing. Likewise they can have their own walls SO which will define their volume as mentioned above to create the chamber. The role of the air tube D can be assumed by a rubber layer, a thin foil, a membrane, a breathless textile or any other material which will, at least partly, separate the pressure space of the tire P from the casing of the tire P. Such a strip of material can also, for example, copy the chamber K lengthwise and make an airtight connection with the wall of tire P.

This design has an advantage that the air flowing through the chamber K and/or around it cools down the tire in every rotation. If the environment of the chamber is not a part of the pressure space of the tire P it can be vented or the air can be exhausted from it through the chamber K when the pumping starts which will decrease the pressure around the chamber K for the inflating period thus increasing its rigidity in an opened state.

From the point of view of pumping the air by deformation the chamber K must not always get hermetically closed by the deformation, it is only necessary that a sufficient amount of air, or any other gas contained within, is evacuated from the chamber K in order to create vacuum during deformations or a pressure lower than the pressure of the source, which provides the gas, for example the environment of the tire P.

Example 7

If the chamber K is made separate from the tire P and its top wall in point of contact with the tire P wall or even the rest of the chamber environment can be provided with soft rubber or foam etc. or with an inflated ring or pad which will absorb both lengthwise and lateral vibrations between the chamber and the tire P wall or the forces causing a temporary mutual lengthwise or lateral shift between the tire P and chamber K and at the same time it can define the distance of the chamber K from the tire P.

Example 8

Czech Republic patent application PV 2008-97 describes the device for adjustment of pressure in tires consisting of or comprising a chamber with shape memory K and a valve suitable as the valve V shown in FIGS. 3A, 5A, and 6A. The valve V is a three-way valve with inputs interconnected with the external environment O and the tire P internal space or internal reservoir IR (see FIGS. 1A-2C), where one input VI is provided with a valve VJ, the next input V2 is connected to the chamber with shape memory K, and the last input V3 is interconnected with the closure element R.

This device allows, apart from others, internal or external air circulation between the chamber and the environment of the tire or between the chamber K and the internal space (such as the inner reservoir IR (FIGS. 1A-2C)) of tire P.

Apart from reduced stress of the chamber K and associated components due to the fact that the pressure inside the chamber K is relatively constant for most of its life, this allows elimination of ineffective capacities in case the chamber K is made in such a way that it closes both at its input and output simultaneously at least once in a revolution. For the chamber K made in this way it does not really matter how big the volumes of the interfaces are because the chamber K will empty these interfaces at the moment of pumping and create a permanent vacuum or overpressure on its input. This principle has been mentioned in Example 4 herein. The device according to an aspect of the present invention will significantly show this advantage for the reason that the chamber K placed at the tread is relatively far off the rim and interconnecting interfaces will be relatively long and with a big inner volume.

Example 9

As seen in FIG. 6A, a tubeless tire P can contain a chamber K at least partially defined by a component C which opens into a backup tube D' (or any other closed contractible or collapsible bag) by its end. If then there is an air leak from the tire P the chamber will reinflate the backup tube D' which will gradually fill up the volume of the tire P and keep it drivable even in case the tire P is damaged and leaking.

For example, backup tube D' can be wound up on the rim 7" which will then inflate only when the tire P is damaged. Such an exemplary design is shown in FIG. 6A where the output VSC from the case SC is interconnected with the non-return through-put valve VP into so far uninflated backup tube D' represented here by the balloon.

Because an undamaged tire P typically leaks by several percent in a month, and in this case, the gradually inflating backup tube D' would be inappropriate because a half-inflated backup tube D' could, for example, flutter inside the tire P, this can be prevented in several ways. The backup tube D' can be provided with an opening leading into the tire P where the backup tube D' is reinflated with air compensating the general leaking of the tire P and/or air flows through the backup tube D' during the internal circulation and this air escapes from the backup tube D' through the opening into the tire P. Because the backup tube D' is pre-tensioned it itself tries to get rid of this air and push it out into the tire P. Only if the tire P leaks with a higher rate and reinflation then takes a longer time the air from the backup tube D' will not make it into the tire P in time and the backup tube D' will then fill up the whole inner volume of the tire P. The size of the opening from the backup tube D' into the tire P can be predefined or it can be controlled or closed by any control element, throttle valve or closing valve, or by the pressure inside the tire P so the throttling of this opening when more air comes into the backup tube D' than leaves into the tire P through the opening of the backup tube D' will cause reinflating.

The control element controlling the opening between the tube D and tire P can be the same control element which closes the last input V3 of the 3-way valve V. This element can thus close both the input V3 and the opening from the backup tube D' into the tire P in one go or it can be a two-position controller which only closes the input V3 when the pressure is low and leaves the opening from the backup tube D' into the tire P open; when there is a major decrease in pressure in the tire P it will close the opening from the backup tube D' into the tire P too.

The case SC itself can consist of or comprise the contracted backup tube D'. Such an example is seen using FIG. 5A where SC=D' and if the tire P leaks faster than being filled through the output VSC (the rate of which is given by its throughput, resistance, and/or throttling; alternatively it can be fitted with a valve) the backup tube D' will expand until it fills up the whole volume of the tire P. If the output VSC then closes, the backup tube D' will fully replace the sealing function of the tire P.

Example 10

Likewise, the control element (which may be a closure element) can control the air inlet of the backup tube D'. In case of a properly inflated tire P the air circulates between the tire P and chamber K or between the external environment O and chamber K. Only when the closure element R activates and the input V3 closes, the air, which originally flows from the chamber K into the external environment O or into the internal environment (such as the inner reservoir IR (FIGS. 1A-2C)) of the tire P, will be redirected so that it flows directly into the backup tube D'. Again, the control or closure element R can be a multi-position/multi direction element which directs the air from the chamber K into the tire P and not the backup tube D' when there is little leaking and only for major and/or faster leaking the closure element directs the air from the chamber K into the backup tube D'.

Also the control or closure element R can, in case of internal circulation in major leaking, first only redirect the output from the chamber K into the backup tube D' while the input of the chamber K stays opened into the tire P and the already compressed air is just shifted from the tire P into the backup tube D' and only after that the input of the chamber K will close temporarily or permanently and if the tire P is still underinflated it will continue to draw air from the ambient O through the non-return valve and the chamber K into the tire P. Such repumping of air is advantageous because the chamber K has a set working volume and repumping of e.g. 1 liter of air under the pressure of 3 A from the tire is more advantageous than repumping of 1 liter of air under the ambient pressure of 1 A from the external environment O.

Likewise in case of external air circulation when in a properly inflated tire P the air only moves from the external environment O into the chamber K and back and for a small drop of pressure the air can be drawn in from the external environment O through the chamber K and then through the non-return valve directly into the tire P or backup tube D' which can again be provided with an opening interconnecting the backup tube D' and tire P. Only in a major leak the air from the chamber K can then be rerouted directly into the backup tube D'. Also in this case, the chamber K suction can be first redirected by the control element R so that the compressed air is first repumped from the tire P into the backup tube D' and only then reinflated from the external environment O. The control element R can be more than a two-position controller depending on how many combinations need to be used.

Example 11

To function properly the control element must be at least partly placed in the environment that it controls in terms of pressure. If the pressure inside the tire P drops rapidly and the sealing function of the tire P is replaced by the sealing function of the backup tube D' it is advisable to interconnect the control element R with the inner environment of the backup tube D'. This can be achieved by placing the control element R into an isolated space interconnected with the internal space (such as the inner reservoir IR (FIGS. 1A-2C)) of the tire P. Only if the sealing function of the tire P is replaced by the sealing function of the backup tube D', or there is a rapid or significant air leak from the tire P this interconnection will be interrupted and it will be replaced by the interconnection of this isolated space with the backup tube D'. Until this moment, the isolated space with the control element R can be only interconnected with the tire P or with both the tire P and the backup tube D'. This moment and the change of interconnection can be set and initiated directly by the control element or also, for example, by the inflation the backup tube D' up to a certain set value when the wall of the backup tube D' mechanically changes the interconnection of this space. Effectively, this space can then be interconnected with the opening from the backup tube D' into the tire P where this space will also get separated from the inside of the tire P after the opening closes, the interconnection with the tire will stay, however.

If the control element is controlled by electronic means based on data from sensors, independent sensors can be placed inside the tire and the backup tube D', the control element will only be controlled by the sensor located within the sealed environment. However, the sensor can be placed even in a completely separated space, for example, in a sealed bag, which, at least partly, is pressed by the air in the tire P or by the wall of the backup tube D' when it gets inflated and fills up the inner space of tire P.

Sensors for readout of the pressure are becoming standard equipment of modern cars. Because the capacity of the chamber and thus also the capacity of the pump per rotation as well as rotation speed are known it can be defined after the start of leaking for example whether the tire puncture is too large and the chamber K can then compensate it only for a limited period of time. In this case the system can advise the driver to stop on a safe place or inform the driver about the actual driving range. If the sensor is placed inside the tire off the backup tube D' and the pressure drop is slow the system will know the reinflation rate of the tire and will find out how much time the backup tube D' will need to take over the sealing function of the tire. Again, if the system determines that the chamber will not compensate the leaking sufficiently it can inform the driver about this in advance. If the tire is punctured along with the base with seams or the backup tube D' with seams the sensors will detect the drop in tire pressure and then an impactual increase at the moment when the seams rip. The pressure will then start either drop or increase and stop when it will reach the preset pressure. When a pressure drop occurs the system will determine from its rate whether the backup tube D' can be reinflated in time or not. The sensor and/or system can be interconnected with the reference space or it can retrieve information about opening of the chamber non-return valve which indicates reinflation or from a different chamber segment from which it gets additional information, for example, that the system has started to reinflate, what is the difference between the pressure of the reservoir space and the tire pressure etc.; thus it can work properly even without information about the wheel revolutions, or it can determine this information by itself.

Replacement of the sealing function by the backup tube D' can be indicated to the driver or rider for example by electronic means or even optically when for example the backup tube D' that is being reinflated or the control element or disconnection of the tire P from the space of the control element placement will slide out a visible indicator from the rim or the wall of tire P can be provided with a transparent window on which the visible wall of the backup tube D' presses etc.

The chamber K mentioned in the examples above is placed by the tread of the tire P, however, it can also be placed anywhere where the distance of the walls of tire(s) P or loaded rim changes.

Example 12

The space for another component CX having a chamber can be made by inserting a cradle HR between the tire P and rim 7''' as in FIG. 7A to 7C. FIG. 7A shows the assembly without the cradle, FIG. 7B then shows the tire P loaded by deformation with the cradle HR, and FIG. 7C shows an unloaded tire P with the cradle HR. A space is created between the tire P and rim 7''' with the use of the cradle HR where the deformation of tire P is bigger than in the assembly shown in FIG. 7A where the deformation would not occur at this place or it would be minimum. The cradle HR can be independent or a part of the tire P or rim 7'''.

Example 13

Figure 8A:
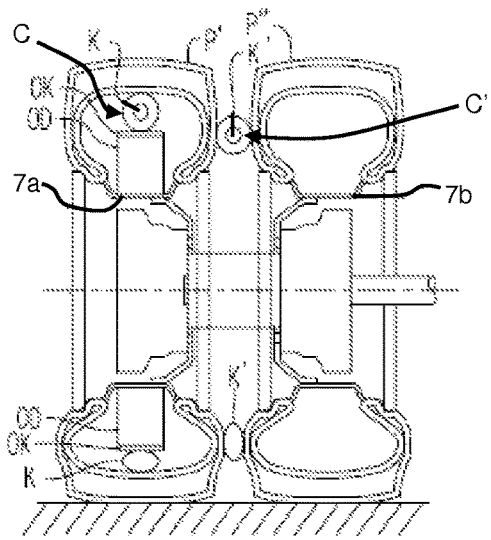
FIG. 8A is a schematic, cross-sectional view of a chamber according to an aspect of the present invention between two tires.

A component C' defining a chamber K' or any pump can be inserted between the two coupled wheels for example in dual tires. FIG. 8A shows the chamber K' at least partially defined by a component C' placed between two tires P' and P''. The top of FIG. 8A shows a chamber K' as through-put in an unloaded point, the bottom of FIG. 8A shows the chamber K' closed between the deformed tires P' and P''' in a point of load.

A component C defining a chamber K can be fixed to the rim 7a or 7b or one of the tires P but effectively a component in the form of a ringlet with the chamber K' with a profile corresponding to the profiles of tire walls can be just placed between the two tires. Such a ringlet, if balanced, will have a tendency to stay concentric with the wheels. At the same time, it can be pre-tensioned against the walls of tires or placed on the wall in such a manner that the converging walls of tires make a narrowing above it.

The chamber can also be inserted between the tires step by step when the chamber K' is integral or in the shape of a strip with a defined section width which is gradually wound between the tires and when it is wound up the ends get connected by a lock. In this way a chamber with overlapping ends can be simply created as in FIG. 8B where after winding-up the chamber K' is constricted and fixed by the tape B with a lock. Likewise, the chamber can lock by itself without the need of the tape B. The tape can make a protection against punctures etc. or it can function as a template for finding a right place with a suitable distance between the tires etc. The winding-up chamber is advantageous due to its simple installation and versatility when one width of the chamber K' can be used for different tire profiles or for tires with various distances.

Figure 8C:
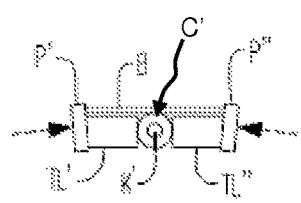
FIG. 8C is a schematic, cross-sectional view of a chamber between two ties according to an aspect of the present invention.
Figure 8D:
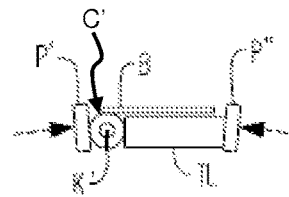
FIG. 8D is a schematic, cross-sectional view of a chamber with a tie according to an aspect of the present invention.
Figure 8B:
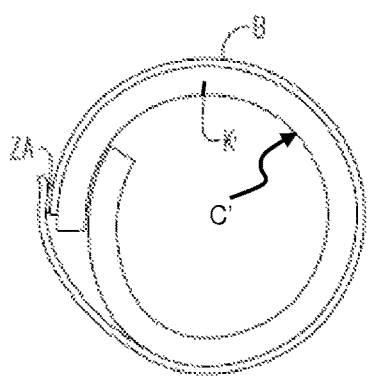
FIG. 8B is a schematic, cross-sectional view of a chamber with overlapping ends according to an aspect of the present invention.

FIG. 8B does not show proper proportions; in fact, both overlapping ends of the chamber will be placed almost in the same distance from the axis of rotation (the chamber K' can have a minimum diameter or distances of its walls in the range of tenths of millimeters and therefore the difference of the distances of overlapping ends of the chamber K' from the rotation axis will be negligible with respect to the radius on which, the chamber ends will lie. Therefore the distance of the walls of the neighboring tires should be similar at both ends of the chamber K'; if this is not the case the chamber K' can be profiled in such a way that it compensates this difference.

FIG. 8C shows a cross-section of the chamber placed between two ties TL' and TL" which set it from the walls of the tires P' and P'". The chamber K' and ties TL' and TL" are fixed by the tape B in a proper radius. The broken arrows show the direction of the movement of walls of the tires when loaded; this movement will then close the chamber K' by the use of ties TL' and TL".

FIG. 8D shows a similar situation, only with the chamber K' placed directly by the wall of the tire P' and only a single tie TL between the chamber K' and the other tire P'".

Example 14

Figure 8E:
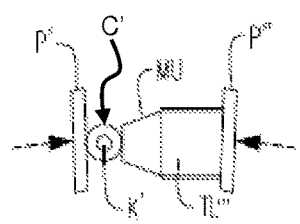
FIG. 8E is a schematic, cross-sectional view of a chamber with a tie and a pressure intensifier according to an aspect of the present invention.

FIG. 8E shows the chamber K' bearing against the pressure intensifier MU which again is bearing against the tie TL'" which is in this case inflated up to the pressure of the tire P'". Because the pressure intensifier MU has a larger area adjoining the tie TL'" than the area adjoining the chamber the air being compressed in the chamber K' up to the pressure of tire P'" has not enough power to force away the pressure intensifier MU into the tie TL'" and this will always result in closing the chamber K' by the deformation of the tires. However, if the tire deformation is larger than necessary just to close the chamber the inflated tie TL'" will partly collapse for the period of such deformation and then it will straighten back with full retention of the chamber K' function.

In the above example the tie TL'" was inflated up to the pressure of tire P'". However, that is not necessary if the tie TL'" is interconnected with the output of the chamber which results in inflation of the tie TL'" by the chamber K' and due to the pressure intensifier the chamber will always be able to reach a higher pressure than the pressure in the tie TL'" and it will thus reinflate it up to the preset value of the pressure. The tie TL'" can be used as a compressed air reservoir or as a case SC. The pressure intensifier MU can be of the same type as the embodiment of FIG. 8E.

Figure 8F:
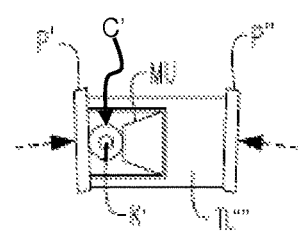
FIG. 8F is a schematic, cross-sectional view of a chamber with a tie and a pressure intensifier according to another aspect of the present invention.

FIG. 8F shows a similar situation but the tie TL'" overlaps the chamber K' by its narrow ends towards the wall of the tire P' and sets the right distance of the chamber K' from this wall. Upon the tire deformation the chamber K' and these narrow ends of the tie collapse as first and reinflation starts.

Figure 8G:
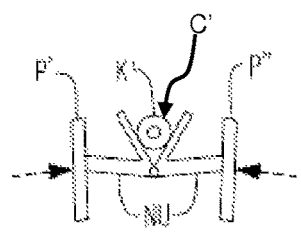
FIG. 8G is a schematic, cross-sectional view of a chamber with ties provided with a joint to form a lever according to an aspect of the present invention.

The FIG. 8G shows the ties provided with a joint thus making a lever NU which can enhance the force closing the chamber K'.

The devices shown in FIGS. 8A-8G are described for dual tires, nevertheless, they will function alike even for separate tires P, for example, between the tire P and rim 7, or between the opposing walls of the tire P. Likewise the tie TL, TL'", TL'" (FIGS. 8D, 8E, 8F) or TL' and TL" (FIG. 8C) can absorb an excessive deformation if connected with the rim or tire. The deformational capacity of the tie can also be ensured by pie-springing; instead of inflation it will be made e.g. using a spring sheet etc. The advantage of the inflated tie lies mainly in its light weight while being firmly fixed in place; it makes easier the assembly and finding the right place especially in combination with the winding-up chamber K', at the same time it can make a reservoir or reference space while also solving the problem of excessive deformation when it simply evades it while first closing the chamber K' by the deformation.

Example 15

Figures 9A, 9B, 9C, 9D:
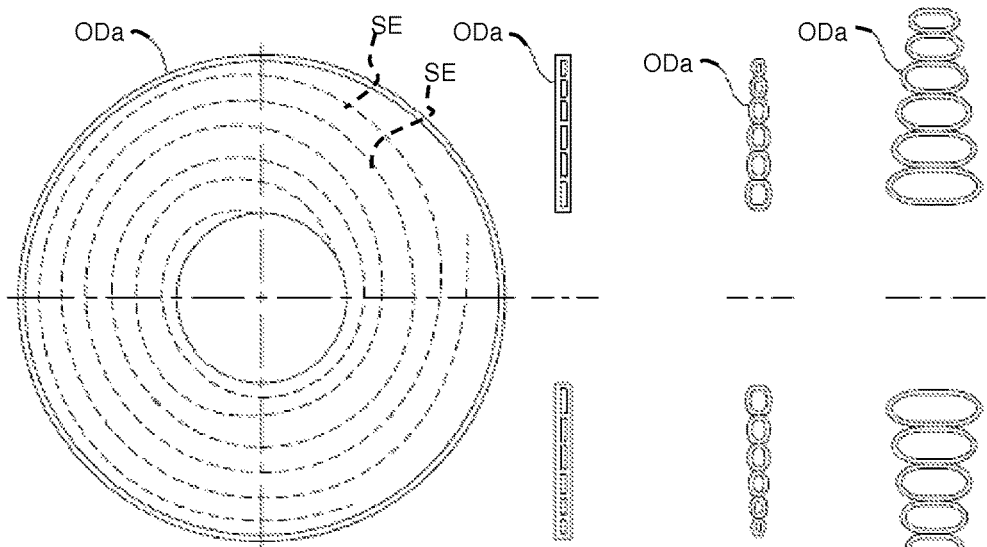
FIG. 9A is a schematic, cross-sectional view of a base for a chamber according to an aspect of the present invention.
FIG. 9B is a schematic, cross-sectional view of an uninflated circle ring of a base for a chamber according to an aspect of the present invention.
FIG. 9C is a schematic, cross-sectional view of a partially inflated circle ring of a base for a chamber according to an aspect of the present invention.
FIG. 9D is a schematic, cross-sectional view of an inflated circle ring of base for a chamber according to an aspect of the present invention.

FIG. 8A also shows the chamber K in the tire P' where the chamber K with the ring OK is placed on a base OD. This can be simply in form of a rigid circle ring placed on the rim 7a (or 7b) as seen in FIG. 8A, however, it can be replaced by a deformation zone absorbing the excessive tire deformations. Effectively, such a base ODa design has a shape shown in FIG. 9A where a rubber, textile, or a like circle ring consists of or comprises two layers of material joined along external and internal circle ring perimeter. Moreover, they can be, as in FIG. 9A, interlinked by a seam SE, for instance. It is there to define the section of the base ODa after its inflation. The seam SE is represented by a broken line. The cross-section of an uninflated circle ring of the base ODa is then shown in FIG. 9B, a partly inflated one in FIG. 9C and fully inflated one in FIG. 9D. Its maximum inflated diameter can be built-in or defined by the ring OK and it can be interconnected with the rim from the bottom.

The base OD can have its own designed pretension and get inflated up to the pressure of tire P; effectively, it can also be deflated and inrolled by the rim on the condition that when its underinflation is detected the air will be let into it from the tire P and it will expand up to its full diameter due to the pretension or centrifugal force. If it has unrolled mainly due to the centrifugal force it can retract to its rolled up position after stopping either because of the pretension of its walls or because of its deflation. The base OD, if unrolled by the centrifugal force, needs not contain the inflatable components and will stay in its unrolled position because of the centrifugal force while, however, it can act against the tire P or chamber K not only by the centrifugal force but even because it is rigid in the direction perpendicular to the direction of the tire deformation or it can spring upon the excessive deformation of the tire P. Such an example is shown in FIG. 10B where the base OD is in its rolled up position and it is unrolled by the centrifugal force in FIG. 10C. Its three components have swiveled clockwise round the joints represented by black spots and have taken up a position with the base rigid in the direction of the movement of the tire wall. A line perpendicular to the rotation axis is represented by a dotted line. The design will retract to its rolled up position, for example, due to the springs in the joints after the centrifugal force ceases. This design is only an example, likewise, the components can move into each other using the guide ways etc. The pump placed at the end can copy a part of the tire P perimeter or even its whole perimeter. Because the perimeter is shorter at the rim than at the tire P the longer pump could overlap in its rolled up position and unroll gradually or it could be crimped etc.

If the base OD is inflatable it can be effectively inflated up to a higher pressure than the tire P.

This will ensure the stability and a simpler design of the base OD.

The inflated base OD can also be used effectively as a compressed air source similar to the case SC described in the Example 5. Thus the chamber K will reinflate the base OD from which the tire P will be refilled as necessary. For example, the base can have a pressure of 3.5 A, the passageway valve of the tire can have a resistance of 0.5 A and properly inflated tire can have a pressure of 3 A. If the tire pressure drops down the passageway valve will open, the tire P will gradually reinflate from the base OD and the chamber K will reinflate the base OD in parallel from the external environment O up to the original pressure of 3.5 A. It is just good to ensure that the drop of air in the base OD, which would affect its supporting function, is slower than its refilling from the chamber K into the base OD. However, this should actually not happen because the pressure in the base OD will always be higher than the pressure in the tire.

The seam joining the walls of the base OD can be designed in such a way that it keeps the walls of the base joined only in certain pressure difference between the tire P and base OD. If the passageway valve between the base OD and tire P is rated so that it can compensate only a limited leak rate from the tire P, and the real leak is higher than that, then the pressure difference between the base OD and the tire will increase, the base OD will try to expand and an increasing force will act on the seam. Upon a certain pressure difference the seam will rip and the walls of the base OD will be expanding until they fill up the whole volume of the tire. The base will thus function likewise the tire tube D in case of big tire puncture. The seam can have a defined weak spot so that it rips only in the right moment and also step by step and safely. Effectively, the output pressure of the chamber K can be lowered from 3.5 A down to 3 A after the seam rupture.

If the pressure of the base OD equals to the pressure of the tire P and the base OD is held in place, e.g., by rigidity of its walls, pre-tensioned ring OK, or by the fact that it separates two pressure spaces of the tire P lengthwise this will function in a similar way, only the output pressure of the chamber K will not have to be lowered.

Both the chamber K and base OD and all the components can then occupy relatively little space within the tire P and at the same time they can be quite rigid and yet they will compensate typical leaks as well as seal the tire in case of its puncture.

Example 16

Each tire has an optimum height of deformation, which is difficult to keep in practice due to changing conditions of loading by cargo etc. The chamber placed on the base OD can be designed so that it closes completely only if the tire deforms more than appropriately when loaded. At the same time, the inflatable cushion in the form of the base OD will ensure that pumping will start even if the deformation is larger than necessary for pumping; the pump will simply evade the deformation or an excessive deformation will be absorbed by the air cushion. This air cushion can be replaced by spring material etc. If the tire P needs to be relieved it can be provided with a bleeder valve or it can get down to a lower pressure than the set value by regular leaks. These can be increased also by choosing low grade materials for tire sealing layers which will result in further production savings.

The inflatable circle ring can be very simply inserted between the tire P and rim 7 and the next steps of the assembly can be as follows: Inflate the air into the chamber K. From there it proceeds to the base OD, which will get inflated and erected and fixed against the rim 7, tire P perimeter, or both. Then the air leaks out of the base OD into the tire P, directly or through the valve, and inflates it. When the tire P is inflated, all the components have the optimum pressure and the system tries to hold it during the drive. If the system includes the control element R in form of a reference space containing the compressed air as a reference medium this reference space can be interconnected with the tire space by a non-return valve. The reference space gets inflated through the non-return valve along with the tire. Then the control element R will try to hold the same conditions. The increase of the set pressure will then be achieved by a mere inflation of the tire P up to a higher pressure which will result in recalibration of the control element R to the new pressure value.

Example 17

So far we have described mainly a spiral-shaped inflatable base OD but it can also be in the shape of concentric circles or alike or it can also be in form of a relatively low base OD located on a rigid cushion. The spiral can be created by winding up of one or more hoses onto each other where the layers can join by a lock, e.g. a bur-fastener. The layer can have a precisely defined maximum cross-section or length regardless of the internal pressure in the layer. If there is an inflated circle layer with a defined cross-section with a 1 cm high wall, for example, W between the chamber K at least partially defined by a component C and the tire P wall the chamber K will be loaded only if the tire P is deformed by 1 cm. If this circle has a variable length it will be inflating until the moment when it leans against the tire P wall. Thus the distance between the chamber and tire P can be set. This circle can have a different pressure than the pressure of the base OD so that the tire gets over it to the chamber K more easily.

Figure 10D:
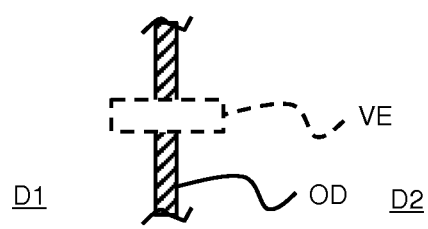
FIG. 10D is a schematic, cross-sectional view of a portion of the base for a chamber of FIG. 10A.

Apart from its setting function, this circle will be a stabilizing support in order to anchor the whole assembly by the rim as well as by the tire. The base OD can contain vents VE (shown in phantom in FIG. 10D) so that it does not divide the tire into sealed parts if required by the application; on the other hand, if the assembly is more stable because it is supported by independent pressure spaces from both sides they can be hermetically divided or at least minimize the interchange of air between these spaces of the tire P. These spaces can be interconnected by valves with resistance in one way, the valves that will open only in a certain pressure difference between the spaces through throttle valves or throttle holes. Basically, the whole base OD can be made only by a membrane or rigid wall separating the two parts of the tire which is held in place by the pressure balance from its sides. However, it should be pre-tensioned in its larger diameter or the spaces should be hermetically divided or it itself must have a sufficient structural rigidity in order not to collapse. Alternatively, the base OD can be made by the walls of two parallel tubes running through the tire as indicated in FIG. 10A or it can run in between them. Effectively, the tubes can be a part of one air tube D (FIG. 2C); they can be even made of several different air tubes if the air tube intersects at least in one point. In the FIG. 10A, the tubes are designated as D1 and D2 while their walls are represented by a dotted or broken line, respectively.

The opposite side of the chamber can then make a lock which will lock the maximum diameter of the base OD. For example, a bur-fastener tape can be attached to this side of the chamber and the opposite tape will gradually expand along the increasing perimeter of the base OD until the moment when both tapes touch and join. At this moment, the diameters of all assembly layers will be fixed. In this way, an all-purpose assembly for different diameters of tires and rims can be made. The chamber K can be interconnected with the components by the rim very easily along the wall of the base OD or under it.

During the assembly, the base OD can be an incomplete circle, i.e. without e.g. a circular sector and when it gets inflated (or deflated, depending on what forces it to take the right position) it will expand to the complete circle. A joint will occur in point of the closed circular sector and the walls of this joint can fix the interface hoses, reference space, etc. Likewise, the air tube can be interrupted in one point and make an incomplete circle where the faces of this circle will join only when they get inflated. An intake into the chamber K from the rim etc. can then run between those faces.

Example 18

Figures 9E, 9F, 9G, 9H, 9I:
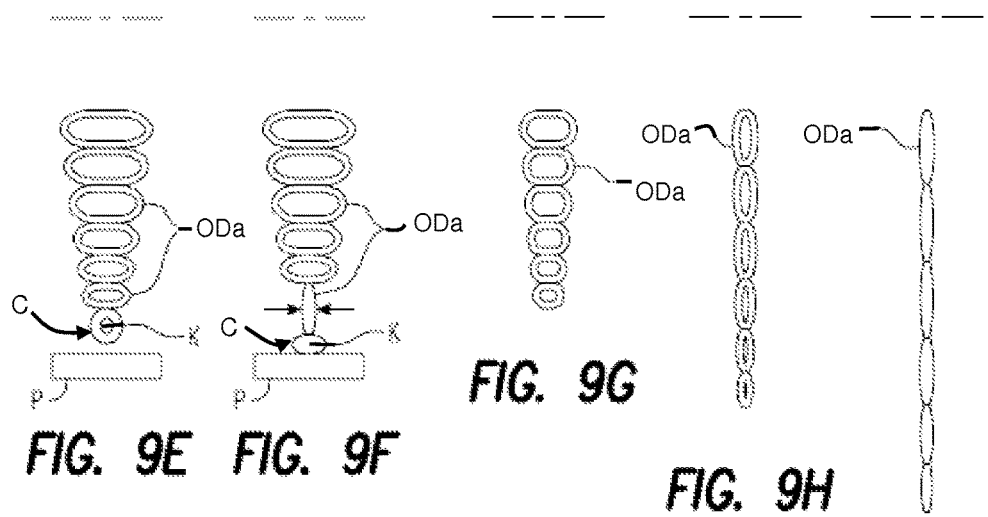
FIG. 9E is a schematic, cross-sectional view of a tire including a base away from the tire according to an aspect of the present invention.
FIG. 9F is a schematic, cross-sectional view of an under-inflated tire including a base supporting a chamber that is shifted toward tire according to an aspect of the present invention.
FIG. 9G-9I are schematic, cross-sectional views of showing a deflection of a base in a tire that is more inflated in FIG. 9G, less inflated in FIG. 9H, and still less inflated in FIG. 9I.

A chamber or a pump need not be fully loaded until it is necessary. FIG. 9E shows the chamber K at least partially defined by a component C on the base ODa away from the tire P even though the tire P is deformed in this point. The base ODa consists of or comprises hollow concentric circles inflated to a pressure higher than the ambient pressure of the tire. For example, they have been inflated manually in one go up to the pressure of the tires P. When an underinflation of the tire P is detected the last circle under the chamber K will be deflated into the external environment O of the tire P. The pressure in the tire will push on the walls of this circle and lower its volume down to the lowest possible value; at the same time, the walls will assume the pre-stressed position which will shift the chamber K at least partially defined by the component C towards the tire P as in FIG. 9F. FIGS. 9G to 9I show a similar deflation and expansion of the whole support ODa with the circular sections of the base deflating from 9G to 9I and also shifting or expanding lengthwise due to pre-stress in the sections from 9G to 9I.

FIG. 9J shows the base ODb with the seams SE' represented by a broken line which runs from the rim 7X towards the perimeter POD of the base ODb. These seams SE' will set the spaces partly divided between them and thus also the distance of the opposing walls of the base ODb when they are inflated to a typical pressure. At the same time, they will make a relatively uniform circular space at the end between the end of the seam and the perimeter of the base ODb. This can be supported by another circular joint CG (FIG. 9K) between the seam ends and the perimeter of the base ODb, which will make a bumper space over itself and absorb possible excessive deformations, which could damage the seam. The seam can be damaged in this way mainly because of the pressure difference between the base ODb and the tire P or another predefined mechanical impulse. Such a base can be easily manufactured as a spiral-shaped overlapping e.g. of one piece of material in multiple layers and then its joining in points of the seam represented by a broken line and permanent joints represented by a double-dotted line. The chamber K can also be made in this way, between the two permanent circumferential joints where it can function even as a ring OK if its bottom joint is firm and wide enough. Thus the whole system can be made in a single operation where the layers are joined for example by rubber vulcanization in a mould which will press together only the spots of permanent joints and seams. FIG. 9K shows the same base in section before joining its layers where the future joints are designated by the letter X. The arrow around the base in FIG. 9J shows the length of permanent joints and thus also the length of the chamber K in this example, it is then possible to make even the chamber K in one step arbitrarily longer than the tire P perimeter. The number of the layers joined is not limited. The chamber K can overlap not only lengthwise side by side but also one above another vertically so that the chamber will be wound up in a spiral way. Also this can be achieved in one fabrication step.

FIGS. 9L and 9M show other design types of the base ODc and ODd where this is being wound up in form of a twisted-pair in layers one upon another, which will ensure its side stability. If a wire W runs through the center of the twisted-pair it will draw the opposing cylinders of the twisted-pair together as well as to the rim. The chamber K can lie on the last layer or, as seen in combination with the base ODc in FIG. 9L, it can be separated from the tire by another twisted-pair layer effectively not joined with the layers of twisted-pair under the chamber K. FIG. 9M shows the base ODd in the form of a narrower twisted-pair without the chamber K being overlapped by another twisted-pair layer.

If the chamber is being wound up in a spiral way and the wire defines the maximum length of the twisted-pair the inner and outer circumference of the base will rotate when being inflated. If the wire will then join the tire or rim or another interconnected component by its end this will also define the diameter of the base. The inflatable pan of the base can have a larger diameter before inflation than the diameter of the rim which will make it seated on the rim. If it was previously connected with the tire it would be simply mounted together with the tire. Likewise, the base can be placed on the rim during the assembly and its maximum circumference is lower than the circumference of the bead or inner side of the tread, which will make the mounting of the tire easier. After inflation the base will erect itself into the tire P and take its final shape. The base expanding in this way can, for example, fix the interface hoses, that have been until then freely uncoiling, below the bottom part of the base. Only after it seats firmly on the rim; after the final inflation it can also finally fix other parts between the tire and rim such as pressure sensors, a power generator, etc.

Example 19

FIGS. 11A-15C show the chamber divided into two parts. Even though there are cases when it can be a higher pressure in one part of the divided chamber than in the other the part with the lower pressure, it can still compress the other part with a higher pressure. This can be achieved for example by using a pressure intensifier described in the Example 14 or a different type of a lever.

The examples illustrated by FIGS. 11A-15C describe mainly the separated parts of the chamber where always at least one of them can be identical with the above-mentioned support OD, or with a tie, an air tube D (FIG. 2C), etc.

Figure 11A:
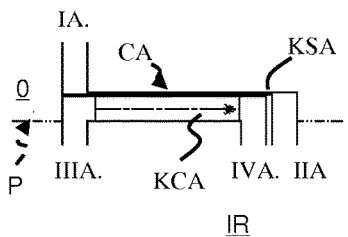
FIGS. 11A-11C are schematic views of portions of divided chambers according to an aspect of the present invention.

The FIG. 11A shows a component CA defining a chamber divided lengthwise into parts KCA and KSA, with 4 openings running into the external environment O of the tire P (portion shown in phantom) or into the internal space (such as the inner reservoir IR) of the tire P. In this example the opening IA leads into the external environment O and the openings IIA to VIA lead into the inner reservoir IR defined, in this instance, by the P. The wall of the tire P or rim 7 or other part separating the inside of the tire P from the outside O of the tire P is represented by a double-dotted line, the area above it is the external environment O and the area below it is the inner reservoir IR of the tire P. When the tire P rotates the deformation of its wall rolls gradually through the chamber K and pushes the air within the chamber K ahead. FIG. 11A shows a point through which the deformation of the chamber K passes. The direction in which the deformation moves is represented by a broken arrow.

Figure 11B:
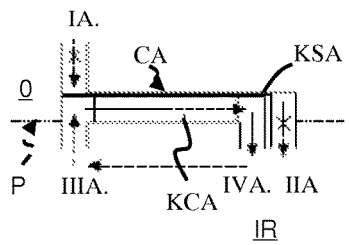

FIG. 11B shows the openings IIIA and IVA as through-put and the lengthwise separated part of the chamber KCA interconnected with them is filled up with air from the tire under the pressure of the tire. When the tire rolls the air circulates from the internal space (such as the inner reservoir IR of the tire P through the opening IIIA, then through the chamber KCA and finally through the opening IVA back to the tire. So this is only an internal circulation of air from the tire into the chamber and back. The lengthwise separated part of the chamber KSA interconnected with the openings IA and IIA is non-throughput in the whole length of the chamber because the whole volume of the chamber is already filled with the lengthwise separated part of the chamber KCA. Thus there is no transfer of air from the external environment O into the inner reservoir IR of the tire P which is indicated by broken arrows in the openings IA and IIA.

Figure 11C:
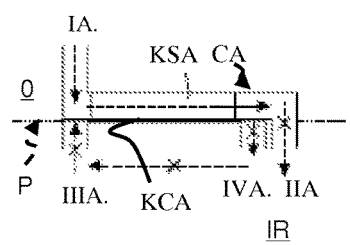

FIG. 11C shows the opening IIIA (alternatively also IVA) closed. The deformation has passed along the separated part of the chamber KCA and pumped its air into the inner reservoir IR of the tire P. Due to the vacuum generated inside it, the part of the chamber KCA has contracted crosswise thus clearing the neighboring lengthwise part of the chamber KSA. So the deformation now transfers the air from the external environment O into the internal space (such as the inner reservoir IR of the tire P through the openings IA and IIA. Because the pressure in the tire is higher than the ambient pressure it is advisable that the part of the chamber KSA is permanently interrupted either by the deformation, so the chamber is constantly interrupted by deformation at least in one point, and/or by one or more valves in order to prevent leaking during reinflation.

To stop pumping the opening IIIA (or eventually IVA) has to be opened, the part of the chamber KCA will then get filled by the air from the tire which will block the part of the chamber KSA. When the tire rolls only the internal circulation occurs as described in FIG. 11B. As described in this as well as other examples, if the part KCA and/or KSA is closed by deformation at both its input and output it will increase the pumping efficiency, nevertheless, it is needs not occur at both parts as the efficiency grows even when this happens at one part only; alternatively such closure can replace the need of some valves.

Example 20

Figure 12A:
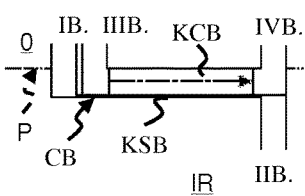
FIGS. 12A-12C are schematic views of portions of divided chambers according to another aspect of the present invention.

FIG. 12A shows a component CB defining a lengthwise divided chamber KCB and KSB where the openings IB, IIB, and IVB lead to the external environment O and the opening IIIB leads to the internal reservoir IR in the tire P (portion shown in phantom) in this example. The direction of the chamber deformation is represented by a broken arrow.

Figure 12B:
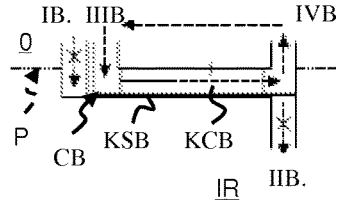

In FIG. 12B the opening JIB or IB is provided with a non-return valve or the part KCB presses on the part KSB and at least in one point it constantly interrupts it and so it does not let the air from the tire into the external environment O through the lengthwise part of the chamber KSB. The openings IIIB and IVB are open and the air circulates through them between the lengthwise part KCB and the external environment O. The chamber KSB is permanently crosswise compressed and not through-going. It is compressed by the pressure of the medium flowing in KC and the pressure of this medium on the lengthwise wall separating KCB from KSB. This pressure can be enhanced or replaced by pretension, enhanced by an pressure intensifier or the output IVB can be throttled so that overpressure against KCB occurs inside KCB thus permanently blocking KSB and avoiding compression of air drawn in from the ambient and its further transfer into the tire.

Figure 12C:
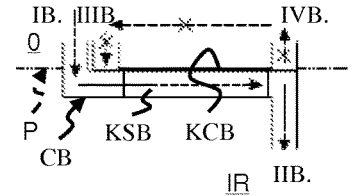

The opening III in FIG. 12C is closed which results in exhausting the air from the part of the chamber KC and pulling its walls together. This pulling together will clear the part of the chamber KSB which will subsequently be filled with the air from the external environment O and then this air will get compressed against the valve at the opening IIB and then pumped into the tire. Again, any opening can be provided with valves. Each valve can also be replaced by the chamber interruption by deformation and by non-throughput crosswise interruption.

Example 14

Figure 13A:
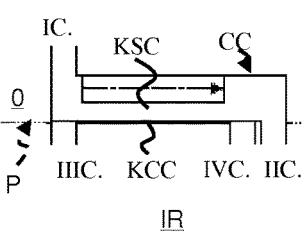
FIGS. 13A-13C are schematic views of portions of divided chambers according to yet another aspect of the present invention.

FIG. 13A shows a component CC defining a lengthwise divided chamber KCC and KSC where the opening IC leads to the external environment O and the openings IIC, IIIC, and IVC lead into the internal reservoir IR in the tire P (portion shown in phantom) in this example. The direction of the chamber deformation is represented by a broken arrow. The chamber is deeper than the deformation passing through it in this case.

Figure 13B:
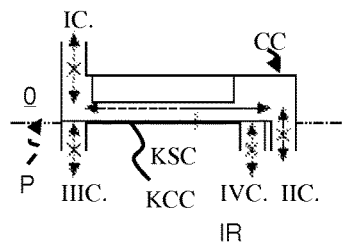

FIG. 13B shows that the reinflation does not start in a chamber created in this way because its lengthwise part KSC connected with the openings IC and IIC is permanently through-going and the deformation in it does not cause necessary compression and transfer towards the tire. No reinflation or no pumping is represented here by crossed broken arrows at the openings IC and IIC. In order to function properly it is necessary that a valve is placed for example at one of these openings or in between them, which will prevent leaking of air from the tire through the part of the chamber KSC.

Figure 13C:
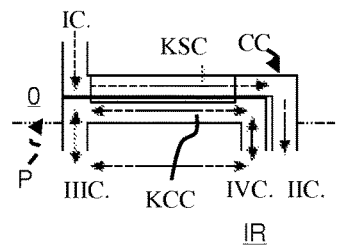

In FIG. 13C the air from the tire is let into the part of the chamber KCC which will contract the section of the part KSC and its depth. The chamber deformation will then close the part KSC crosswise and transfer the air from the external environment O into the internal space (such as the inner reservoir IR) of the tire. Thus the air from the tire can be let in the part KCC only under the tire pressure or lower, but also higher if the deformation passes through a sufficient depth so that it first reinflates the air through the opening IIIC into the chamber KSC thus "inflating" this part up to the volume needed that is sufficient for crosswise contraction of the section of the part of chamber KSC.

Example 21

Figure 14A:
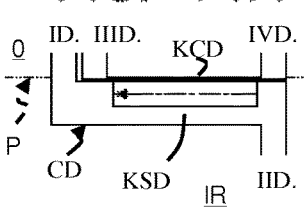
FIGS. 14A-14C are schematic views of portions of divided chambers according to still another aspect of the present invention.

FIG. 14A shows a component CD defining a lengthwise divided chamber KCD and KSD where the openings ID, IIID, and IVD lead to the external environment O and the opening IID leads to the internal reservoir IR in the tire P (portion shown in phantom) in this example. The direction and depth of deformation of the chamber K is represented by a broken arrow.

Figure 14B:
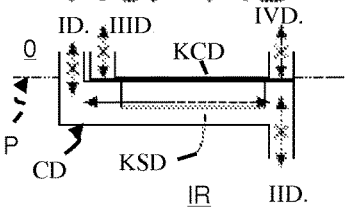

FIG. 14B shows that reinflation does not start in a chamber created in this way because its lengthwise part KSD connected with the openings ID and IIID is permanently through-going and the deformation in it does not cause the necessary compression and transfer towards the tire. No reinflation or no pumping is represented here by crossed broken arrows at the openings ID and IID. In order to function properly it is necessary that a valve is placed at one of these openings or in between them, which will prevent leaking of air from the tire through the part of the chamber KSD.

Figure 14C:
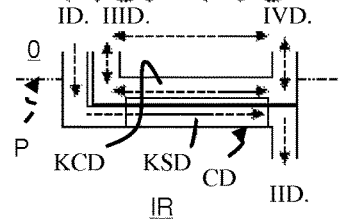

In FIG. 14C, air from the external environment O is let in or pumped to the part of the chamber KCD which will contract the section of the part KSD and its depth. The chamber deformation will then close the rest of the section of the part KSD of the chamber crosswise and transfer the air from the external environment O into the internal space (such as the inner reservoir IR) of the tire. Thus the air from the tire can be let in the part KCD only under the ambient pressure or lower, first it reinflates the air through the opening IIID into the part of the chamber KCD thus "inflating" this part up to the volume needed that is sufficient for the crosswise contraction of the section of the part of chamber KSD. In this case it is also necessary that a valve is placed also at the opening IVD, which will keep the part of the chamber KCD inflated; alternatively, some of the valves can be replaced by the deformation. Again, the part KSD can press on the part KCD through a lever.

Figure 15A:
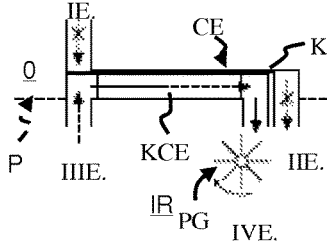
FIGS. 15A-15C are schematic views of portions of divided chambers according to still yet another aspect of the present invention.

FIG. 15A shows a power generator PG placed at the output from a chamber section KCE of a component CE of a tire P (portion shown in phantom), the component defining sections KCE and KSE. The generator PG in this case consists of or comprises a blade wheel, however, it can be any other type of a generator propelled by air jet or air pressure, e.g. a rotating ball, propeller, piezo-electric generator, etc. The generator PG can be placed at the chamber inlet or outlet, it can be a divided as well as undivided chamber designed for tire inflation but even a chamber created only for the propulsion of the generator PG and not inflation. It means that the generator PG can be placed behind any type of the chamber with shape memory deformed by the tire. The generated electric power can be accumulated in form of electricity and/or it can be used to propel electric equipment in the wheel or tire, e.g. pressure and other sensors, wheel data transmission devices, etc.

Figure 15B:
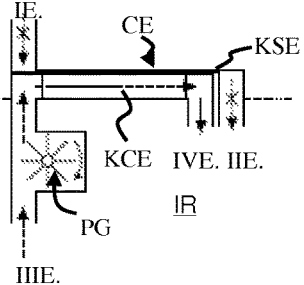
Figure 15C:
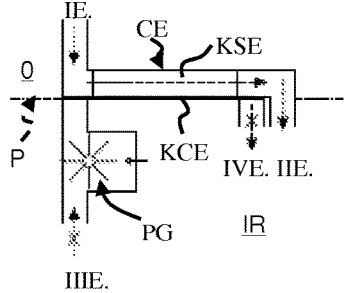

FIG. 15B shows a generator PG at the inlet of the part of chamber KCE in the moment of air circulation between the tire and part of the chamber KCE. The generator PG also functions as a valve if it is mechanically or electrically stopped, the air at this inlet into KCE is throttled or completely ceases to flow and KCE is collapsing thus blocking KSE. The generator PG can also function as a valve or a throttle valve. If it is fitted with a free-wheel it will function as a mechanical non-return valve etc. In the example the generator PG in FIG. 15C has been stopped mechanically by its move in the direction of the thin broken arrow towards the left wall. This is a blade-wheel generator; however, any other known type of a generator can be used, e.g. one based on a propeller, gear-wheel pump, piston-type generator, piezo-electric generator, etc. The generator PG needs not generate only electric power but also a mechanical work and it can also propel for example another pump etc. It can also function as a sensor (the velocity of the air flowing around it is direct dependent on the speed of the wheel) or it can be affected by the change of pressure and temperature etc. The change of speed or of the power generated is then directly associated to the change of these parameters.

The solutions described in the above examples are described especially in location by the tire tread, between the tire and rim, or between two tires. However, they can be placed in any place between two points changing their relative distance while one of them can be placed on the tire or next to it.

The electric power generator PG can consist of or comprise a coil moving in the magnetic field, where one part is connected with the tire and the other with the rim. One or more coils then can be connected with the base or rim and the magnetic layer with the tire P or vice versa, while the components are appropriately shaped in order to make linear movements between the coil and the source of magnetic field.

INDUSTRIAL UTILITY

The chamber with shape memory for pressure adjustment in the tire according to this invention will find its application in production of new tires and in modification to existing tires, both for passenger vehicles and utility vehicles, bicycles, or motorcycles.

The invention claimed is:

1. A device for transport of air for a tire, comprising
a component that at least partially defines a chamber, the component being adapted to be placed along at least a part of a perimeter of the tire,
a ring disposed radially inwardly of a radially inner side of the component, wherein a radial distance between the radially inner side of the component and an axis of rotation of the tire is equal to 1 to 1.1 times a radial distance between a radially outer side of the ring at lateral edges of the ring at radially outermost parts of the ring and the axis of rotation of the tire; and
a structure distinct from the tire, the structure defining an inner reservoir adapted to be at least partially disposed between the ring and the tire, wherein the component is disposed outside of the inner reservoir, and wherein an exterior surface of the structure is in contact with an inner surface of the ring.

2. The device for transport of air for a tire according to claim 1, wherein the component comprises a valve on at least one end thereof in communication with the chamber.

3. The device for transport of air for a tire according to claim 2, wherein the valve comprises a three-way valve with inputs interconnected with an external environment and an internal space, wherein a first input is provided with a valve, a second input is connected to the chamber, and a third input is interconnected with a closure element.

4. The device for transport of air for a tire according to claim 1, wherein the chamber is connected to at least one of the inner reservoir, a backup tube, a case, and a base.

5. The device for transport of air for a tire according to claim 1, wherein the ring is placed on the structure.

6. The device for transport of air for a tire according to claim 1, wherein an end of the chamber is interconnected with the inner reservoir.

7. The device for transport of air for a tire according to claim 1, wherein an end of the chamber is interconnected with a control element.

8. The device for transport of air for a tire according to claim 1, wherein the chamber has a wall comprising a pair of surfaces that form an angle $\alpha=0$ to $120°$ with each other.

9. The device for transport of air for a tire according to claim 1, comprising a space between the ring and the component.

10. A tire rim comprising a device for transport of air for a tire, the device comprising
a component that at least partially defines a chamber, the component being adapted to be placed along at least a part of a perimeter of the tire when the tire is mounted on the rim, and
a ring disposed radially inwardly of a radially inner side of the component, wherein a radial distance between the radially inner side of the component and an axis of rotation of the rim is equal to 1 to 1.1 times a radial distance between a radially outer side of the ring at lateral edges of the ring at radially outermost parts of the ring and the axis of rotation of the rim; and
a structure distinct from the tire, the structure defining an inner reservoir adapted to be at least partially disposed between the ring and the tire, wherein the component is disposed outside of the inner reservoir, and wherein an exterior surface of the structure is in contact with an inner surface of the ring.

11. The tire rim as set forth in claim 10, comprising a space between the ring and the component.

\* \* \* \* \*